Aug. 2, 1960 W. F. KING ET AL 2,947,175
BALANCING DEVICE
Filed Sept. 23, 1954 2 Sheets-Sheet 1

INVENTORS
Kauno E. Sihvonen, &
BY William F. King
L. D. Burch
ATTORNEY

Aug. 2, 1960

W. F. KING ET AL 2,947,175

BALANCING DEVICE

Filed Sept. 23, 1954

INVENTORS
Kauno E. Sihvonen, &
BY William F. King
L. D. Burch
ATTORNEY

United States Patent Office 2,947,175
Patented Aug. 2, 1960

2,947,175
BALANCING DEVICE

William F. King, Birmingham, and Kauno E. Sihvonen, Detroit, Mich., assignors to General Motors Corporation, Detroit, Mich., a corporation of Delaware Filed Sept. 23, 1954, Ser. No. 457,895

3 Claims. (Cl. 73—483)

This invention relates to balancing machines in general and more particularly to automatic balancing machines for correcting rotary members for balance.

The trial and error method of balancing a rotary member has long been replaced by more accurate and expeditious means. Present balancing machines are principally adapted for use in small precision shops and laboratories. Such machines provide accurate balance computation but in most instances are not adapted to arrive at such computations as expeditiously as one would like Balancing on the assembly line or for assembly line production requires a much fore rapid computation of unbalance characteristics than has heretofore been available. Mass production balancing requires a balancing machine which will perform its function in a minimum of time and which will nevertheless be as accurate as other adaptable but slower balancing means.

It is now proposed to provide a balancing machine which is adapted to receive a member for balance analysis, to make such analysis, and to provide for correction of the unbalance in the member. It is proposed to combine the balance and correction steps in such a machine to provide for the automatic operation of the machine upon the member being tested and at the angular location of unbalance and upon completion of the balance analysis.

It is further proposed in this instance to mark the member with the corrective measures to be taken at the determined angular location of unbalance. The proposed balancing machine or device includes conventional and well-known electrical units which are commercially available and therefore is less expensive and more readily serviced than most other machines of its kind. It is proposed to provide a means of horizontally supporting a member to be tested about its normal axis of rotation and to detect the deflection of such member in planes disposed ninety degrees apart. The vectorial summation of the signals received from the pick-up or balance detecting means is reflective of the magnitude and angular disposition of the unbalance portion of the member under test. The combination of the unbalance signals is thereafter compared with a reference signal to provide an amplitude signal operative upon a marker wheel adapted to mark the member with the corrective measures to be taken. The combined unbalance signals also provide a pick-up voltage having a phase relationship to the angular location of unbalance. It is proposed to compare the phase of the unbalance signal with the phase obtained from a variable phase selector and to utilize the variance signal to actuate one of a plurality of members equally spaced about the member under test and to thereby engage the member at the proper location for balance correction.

Figure 3:
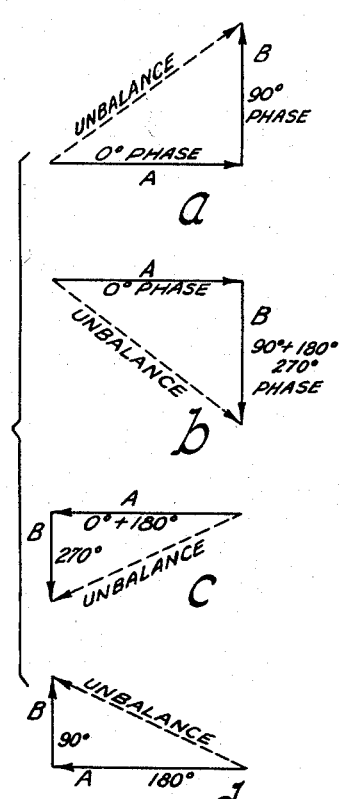

Figure 3, including diagrams a, b, c and d, illustrates various vector diagrams which are useful in understanding the present invention.

Figure 4:
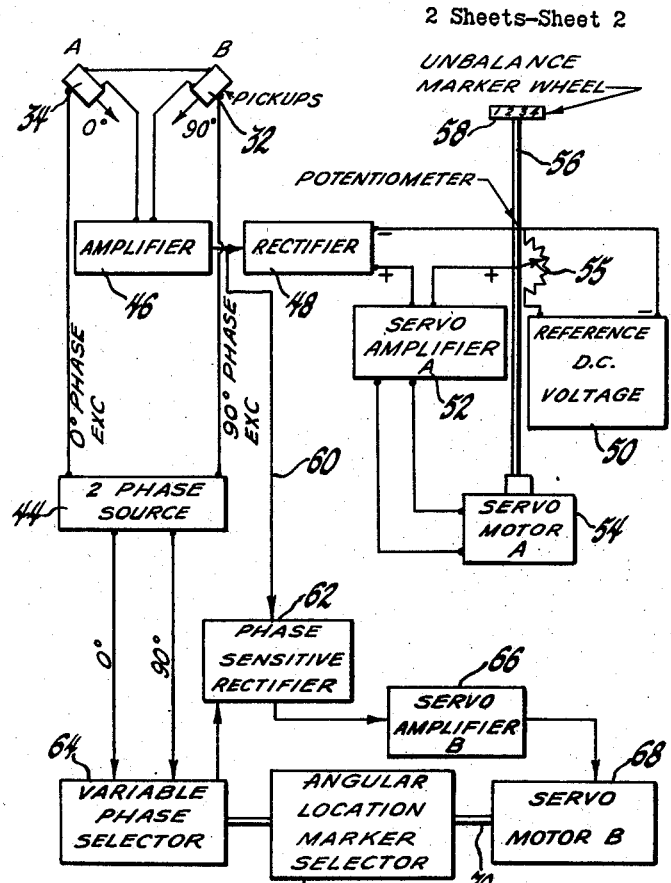

Figure 4 is a block diagrammatic representation of the electrical components of the unbalance detecting and marking apparatus in accordance with the present invention.

The balancing machine here described is one adapted to balance vehicle wheels. A vehicle wheel and tire assembly 10 is disposed upon a support spindle 12 including a flange 14 for receiving the disc portion 16 of the wheel and adapted to centrally support the wheel and tire assembly horizontally. The support spindle is recessed at one end as at 18 adapted to be received upon the end of a pivot shaft 20 vertically upstanding from a base member 22. The end of the pivot shaft 20 is here formed to provide a pivot point 24 which is received within a conical depression 26 formed in the recess 18 of the support spindle 12 to pivotally support the wheel and tire assembly 10 for free tilting movement. The present invention is not dependent upon this type of pivotal support and any other pivotal support means such as a pendant support, ball joint, air jet or other means might as well be employed.

In the present instance, the support spindle 12 also includes depending rods 28 and 30 disposed 90° apart and connected at their lower ends to pick-up members 32 and 34 respectively. The pick-up members 32 and 34 are mounted on base 22 and are likewise disposed 90° apart. The rods 28 and 30 are rigid parts of spindle 12 and enable translation of the tilting movement of the spindle, caused by any unbalance in the wheel and tire assembly 10, to the pick-ups 32 and 34. The pick-ups are preferably of the variably differential transformer or linear potentiometer type, both well-known and accepted in the art of linear displacement detection, as described in "Proceedings of the Society for Experimental Stress Analysis," volume IV, No. 2, page 79, in an article entitled "Linear Variable Differential Transformers," by Mr. H. Schaevitz, or other acceptable detection means.

Suitable balance corrective means, such as the angular location markers 36 shown, are mounted upon the base member 22 and are uniformly spaced therearound. Each marker 36 includes an arm 38 having a striker 40 disposed at the outer end thereof. Upon selection of a particular marker 36 the arm 38 swings upwardly to cause the striker 40 to contact and mark the rim 42 of the wheel and tire assembly 10.

Within the base member 22 are disposed several control units which are shown diagrammatically in Figure 4 for reasons of simplification, these units being well-known and understood in the art. The operational part performed by these units in this invention will be understood by those familiar with electrical devices generally and balancing machines in particular through the following description.

The pick-ups 32 and 34 are excited by an alternating source of voltage 44, of say sixty cycle, having phasing of 0° and 90° respectively. The unbalance of the wheel and tire assembly 10 causes the support spindle 12 to tilt and thereby produce electrical signals from each pick-up proportional to the components of displacement in the planes of the pick-ups. Referring to Figures 3a, b, c and d it will be seen that each pick-up provides an output signal proportional in amplitude to the component of displacement from a balanced position and indicative by phase of the direction of tilt.

Pick-up 34 produces an electrical signal proportional in amplitude to the component of displacement along the the axis of pick-up 34 and having an electrical phasing of 0° or 180° indicative of motion toward or away from this pick-up. Pick-up 32 likewise produces an electrical signal proportional to the component of displacement along its axis but having an electrical phasing of 90° or 270° indicative of motion toward or away from pick-up 32. The addition of the two signals, obtained by connecting pick-ups 32 and 34 in series electrically, produces an electrical voltage as vectorially represented on Figs. 3a, b, c and d by the vector labeled Unbalance. This Unbalance voltage is proportional in amplitude to the mechanical unbalance and has an electrical phase which corresponds to the mechanical angular location of the unbalance. Since the output of the individual pick-ups is representative of the component of unbalance in the planes of the pick-up (spaced 90° apart), electrically combining the signals, by connecting the output leads from the pick-ups in series, provides a signal proportional in amplitude to the unbalance and of an electrical phase corresponding to the mechanical angular location of unbalance. As shown on Fig. 4 the pick-ups 32 and 34 are connected in series electrically and the summation signal is fed through the amplifier 46 only to magnify the signal. Rectification by a rectifier 48 converts the signal to a D.C. voltage. Since the amplitude of the A.C. signal voltage was proportional to the magnitude of unbalance, the D.C. voltage obtained from rectification will also be proportional to the magnitude of unbalance. The direct current output is compared with a direct current reference voltage received from a source 50 and the instantaneous difference is used as an error signal input to a servo amplifier 52 which causes servo motor 54 connected thereto to rotate in a direction which will cause the potentiometer tap 55 to assume the same voltage level as the output of rectifier 48. Since the angular disposition of the potentiometer shaft 56 at balance corresponds to the unbalance amplitude, a marker wheel 58 may be associated with the shaft 56 and be calibrated to show the size of correction weight which must be added to restore balance. The marker wheel 58 may be disposed at any convenient location adjacent the member being tested for balance and may be actuated to engage and mark the work member by any suitable means, such for example as is shown and described in United States Patent No. 2,821,858 titled "Balancing Machine" in the name of William F. King and issued February 4, 1958, though other means of actuating the marker wheel to strike and mark a workpiece might equally as well be employed without departing from the spirit of the invention here presented.

The amplified pick-up voltage having a phase at sixty cycles which corresponds to the angular location of unbalance is introduced through lead 60 into a phase sensitive rectifier 62. Such phase sensitive rectifier is conventionally known and such as described in Robert's book "Mechanical Measurements by Electrical Methods," page 257, Instruments Publishing Company, Incorporated, of Pittsburgh, Pennsylvania, 1st edition, 1946. Other phase sensitive rectifiers may be equally as adaptable for use. The two phase source of excitation 44 is passed through a variable phase selector 64 such as that described by the "Kollsman Special Purpose Motors Catalogue," edition of March 1, 1949, on page E-43, published by the Kollsman Instrument Division of Square-D Company, Elmhurst, New York, or other adaptable variable phase sensitive selector means to produce a phase reference signal which is fed into the phase sensitive rectifier 62 for comparison with the phase of the unbalance signal received from the amplifier 46. The output of the phase sensitive rectifier 62 is a direct current voltage having an output and sign related to the phase difference between the amplified pick-up signal and the output of the variable phase selector 64. Such output or error signal from the phase sensitive rectifier 62 is fed through a servo amplifier 66 to a servo motor 68. The servo motor 68 is caused to rotate in a direction to obtain the balance phasing of 90° which is a zero or nullified signal. The output of the phase sensitive rectifier 62 varies as the phasing between the input signals is changed. The servo motor 68 is operative on a common shaft 70 with the variable phase selector 64 and therefore is adapted to vary the phasing of one of such input signals to rectifier 62.

Figure 1:
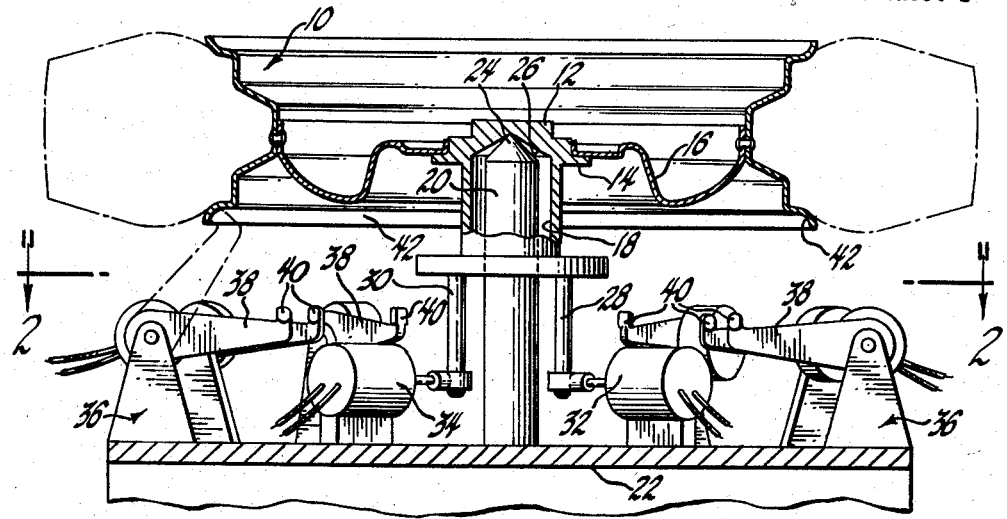
Figure 1 is a sectional elevational view of a wheel balancing and marking installation in accordance with the present invention.
Figure 2:
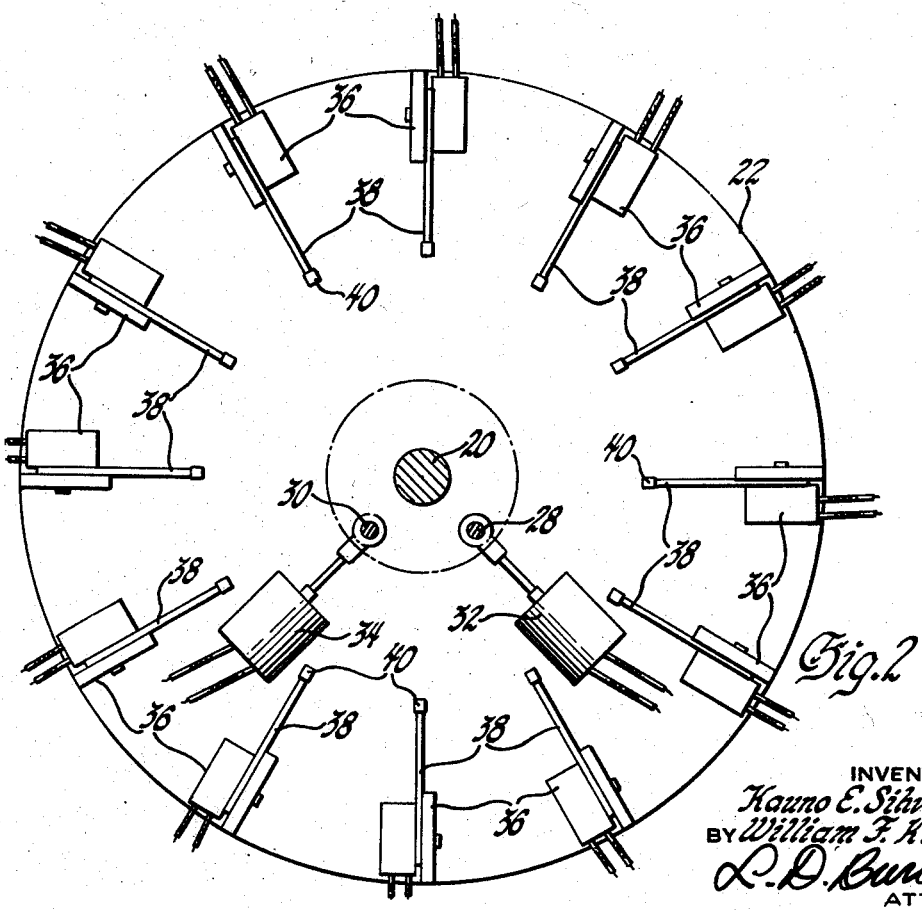
Figure 2 is a view taken in the direction of line 2—2 of a part of the apparatus of Figure 1.

An angular location marker selector 72, such as a slide bar contact tap or other adaptable rotary switch means, is on the shaft 70 with the servo motor 68 and variable phase selector 64 so that the angular positioning of the shaft 70 is adapted to select the angular location marker 36 of Figure 2 corresponding to the location at which the correction is required to be made to the wheel and tire assembly 10 and to actuate the particular position marker and, if desired, the amplitude marker means, to strike the wheel and tire assembly.

We claim:

1. Unbalanced detection apparatus comprising a support for having a workpiece mounted thereon in a substantially horizontal plane, said support including pivot means to allow said workpiece to come to rest in an inclined position, the amount and direction of which are functions of any unbalance present therein, a pair of electromechanical transducers operatively interconnected with said support at a pair of orthogonal locations and responsive to said inclining movement of said workpiece, each of said transducers being excited by sources 90 degrees out of phase with each other, each of said transducers being effective to produce a signal having an amplitude representing the amount of displacement of said workpiece in a direction parallel to the axis of the transducer and a phase representing the direction of said displacement, means operatively interconnected with said transducers and responsive to said signals for vectorially combining said signals to produce an indication of the unbalance in said workpiece.

2. Unbalance detection apparatus comprising a support for having a workpiece mounted thereon in a substantially horizontal plane, said support including pivot means to allow said workpiece to come to rest in an inclined position, the amount and direction of which are functions of any unbalance present therein, a pair of electromechanical transducers operatively interconnected with said support at a pair of orthogonal locations and responsive to said inclining movement of said workpiece, each of said transducers being excited by sources 90 degrees out of phase with each other, each of said transducers being effective to produce a signal having an amplitude representing the amount of displacement of said workpiece in a direction parallel to the axis of the transducer and a phase representing the direction of said displacement, means operatively interconnected with said transducers and responsive to said signals for producing an output representing the vectorial sum of said signals, indicator means interconnected with said last mentioned means and responsive to the amplitude of said output to produce an indication of the amount of unbalance in said workpiece.

3. Unbalance detection apparatus comprising a support for having a workpiece mounted thereon in a substantially horizontal plane, said support including pivot means to allow said workpiece to come to rest in an inclined position, the amount and direction of which are functions of any unbalance present therein, a pair of electromechanical transducers operatively interconnected with said support at a pair of orthogonal loactions and responsive to said inclining movement of said workpiece, each of said transducers being excited by sources 90 degrees out of phase with each other, each of said transducers being effective to produce a signal having an amplitude representing the amount of displacement of said workpiece in a direction parallel to the axis of the transducer and a phase representing the direction of said displacement, means operatively interconnected with said transducers for vectorially combining said signals to produce a resultant output, phase responsive means interconnected with said last mentioned means and responsive to the phase of said resultant output relative to one of said sources to indicate the location of the unbalance in said workpiece.

References Cited in the file of this patent

UNITED STATES PATENTS

| | | |
|---|---|---|
| 1,701,464 | Kraft | Feb. 5, 1929 |
| 2,155,528 | Cadden | Apr. 25, 1939 |
| 2,243,379 | Johnson | May 27, 1941 |
| 2,331,733 | Senger | Oct. 12, 1943 |
| 2,461,645 | Kallman | Feb. 15, 1949 |
| 2,515,969 | Shivers | July 18, 1950 |
| 2,534,918 | Kroft et al. | Dec. 19, 1950 |
| 2,701,474 | Goudy | Feb. 8, 1955 |
| 2,711,590 | Wilcox | June 28, 1955 |
| 2,792,725 | Lannen | May 21, 1957 |